Aug. 13, 1929.                E. BEARD                1,724,171
                    HAND TRUCK EXTENSION FRAME
                       Filed July 14, 1928
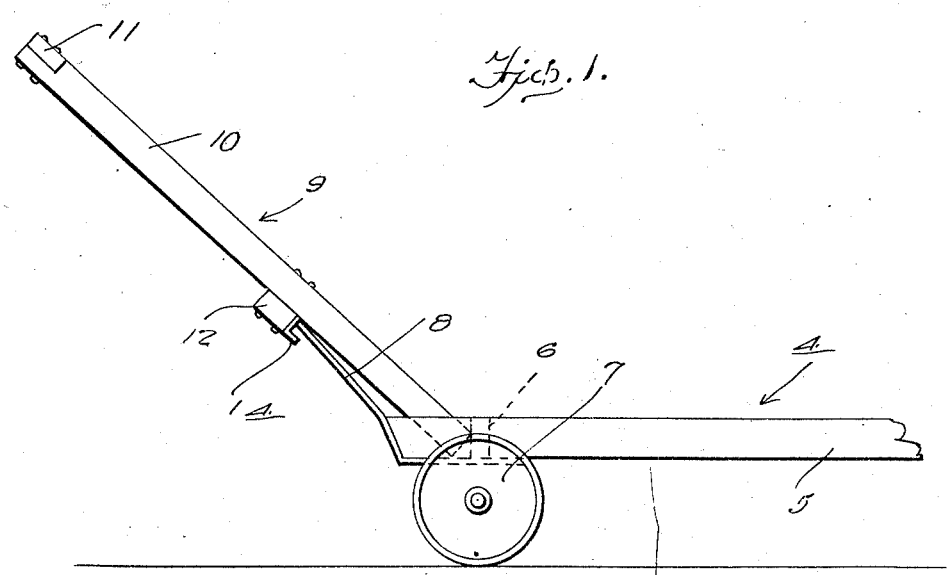
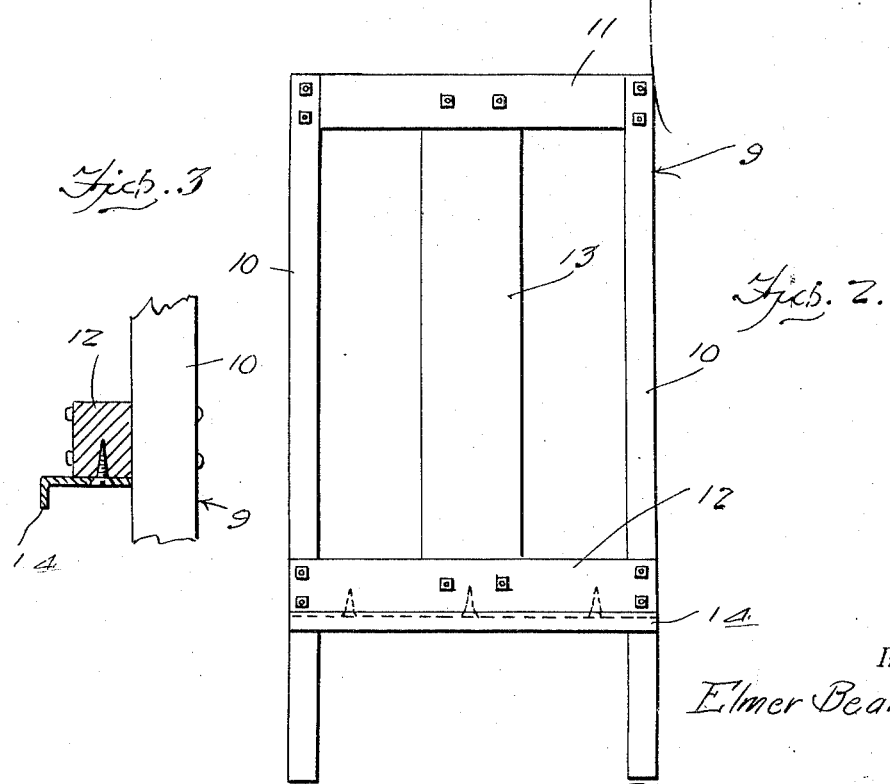
Inventor
Elmer Beard Patented Aug. 13, 1929.

1,724,171

UNITED STATES PATENT OFFICE.

ELMER BEARD, OF NIAGARA FALLS, NEW YORK.

HAND-TRUCK EXTENSION FRAME.

Application filed July 14, 1928. Serial No. 292,707.

This invention relates to an attachment for a hand truck, the same being in the form of a frame and serving as an extension for a nose plate, such as is ordinarily employed on trucks of this character.

The purpose of the invention is to provide an extension frame, which when associated with the nose of the truck, will permit the truck to better fulfill the requirements of a device of this class by permitting a comparatively heavy load to be transported thereon in well balanced style.

The attachment is so made as to permit it to be detachably mounted on a hand transporting truck of the type embodying a transverse or cross brace. The details are arranged to permit the attachment to be readily applied and removed, to be held in place by the foremost cross brace and the existing load supporting nose.

In the drawings:—

Figure 1 is a fragmentary side elevational view of an ordinary hand truck equipped with an attachment constructed in accordance with the present invention.

Fig. 2 is an elevational view of the attachment per se.

Fig. 3 is an enlarged detail sectional and elevational view emphasizing certain of the details of the attachment.

Considering the drawings now by reference numerals, it will be observed that 4 designates an ordinary portable hand truck such as is employed for transporting barrels, boxes, bundles, bales, and the like.

The truck embodies the customary longitudinal side rails 5 and cross braces, one of which is designated in dotted lines at 6. In addition, the truck has the customary small front wheels 7 and a suitably constructed load supporting nose 8.

The attachment is generally designated by the numeral 9 and as before intimated is in the form of a frame. It includes vertical side bars 10, connected by a cross piece 11 at the top and by a cleat 12 at the bottom. Between the parts 11 and 12, is a suitable backing member 13. It is to be observed that the lower ends of the bars 10 extend beyond the cleats 12 and beyond an angle bar 14 which is mounted on this cleat. Incidentally, this angle bar provides a keeper which removably receives the outer end of the nose piece or plate 8, as shown in Fig. 1.

With this arrangement, it is obvious that that the extension frame is placed in an inclined position as shown in Fig. 1, in which the lower ends of the side bars 10, abut the foremost cross brace 6, while the outer end of the plate 8 extends into the keeper formed by the angle bar 14. This extension permits the load to be piled, so that a single person can carry anywhere from seven to eight hundred pounds.

The attachment is readily placed in position or removed, and is sturdy, held firmly in place, and is such as to balance the load in a desirable manner to relieve the operator of undue strain and effort.

The simplicity of the invention is such as to obviate the necessity of a more detailed description. Minor changes in shape, size, and materials, coming within the field of invention claimed may be resorted to if desired.

Having thus described my invention, what I claim as new is:—

As a new product of manufacture, an attachment for a hand truck of the class described comprising a frame including longitudinal side bars, a cross piece connecting the bars together at one end, a cross cleat connecting the intermediate portions of the bars together, the bars at one end extending beyond said cleat for abutting relation with a cross brace on the truck, and an angle bar carried by said cleat and functioning as a keeper for cooperation with the nose plate on said truck.

In testimony whereof I affix my signature.

ELMER BEARD.